(12) United States Patent
Kim et al.

(10) Patent No.: US 12,252,024 B2
(45) Date of Patent: Mar. 18, 2025

(54) ELECTRIC VEHICLE CHARGING CABLE

(71) Applicants: LS CABLE & SYSTEM LTD., Anyang-si (KR); LS EV KOREA LTD., Gunpo-si (KR)

(72) Inventors: Hyun Woong Kim, Suwon-si (KR); Jae Bok Lee, Seoul (KR); Dong Kyun Yoo, Yongin-si (KR); Uk Yeol Choi, Seoul (KR)

(73) Assignees: LS CABLE & SYSTEM LTD., Anyang-si (KR); LS EV KOREA LTD., Gunpo-si (KR)

( * ) Notice: Subject to any disclaimer, the term of this patent is extended or adjusted under 35 U.S.C. 154(b) by 589 days.

(21) Appl. No.: 17/640,201

(22) PCT Filed: Sep. 4, 2020

(86) PCT No.: PCT/KR2020/011936
§ 371 (c)(1),
(2) Date: Mar. 3, 2022

(87) PCT Pub. No.: WO2021/045560
PCT Pub. Date: Mar. 11, 2021

(65) Prior Publication Data
US 2022/0314822 A1    Oct. 6, 2022

(30) Foreign Application Priority Data

Sep. 5, 2019  (KR) .......................... 10-2019-0109891
Sep. 4, 2020  (KR) .......................... 10-2020-0112883

(51) Int. Cl.
*B60L 53/18*    (2019.01)
*B60L 53/16*    (2019.01)
(Continued)

(52) U.S. Cl.
CPC ............... *B60L 53/18* (2019.02); *B60L 53/16* (2019.02); *B60L 53/302* (2019.02); *H01B 7/425* (2013.01)

(58) Field of Classification Search
CPC ........ B60L 53/18; B60L 53/302; B60L 53/16; H01B 7/425
(Continued)

(56) References Cited

U.S. PATENT DOCUMENTS

2013/0001462 A1   1/2013   Choi et al.
2013/0269966 A1   10/2013  Emme
(Continued)

FOREIGN PATENT DOCUMENTS

CN    106887277 A    6/2017
CN    206574531 U    10/2017
(Continued)

OTHER PUBLICATIONS

Office Action for related Korean Application No. 10-2020-0112883; action dated May 19, 2022; (6 pages).
(Continued)

*Primary Examiner* — Suresh Memula
(74) *Attorney, Agent, or Firm* — K&L Gates LLP (57) ABSTRACT

The present disclosure relates to an electric vehicle charging cable, in which a cooling fluid is used to efficiently cool heat generated during charging of an electric vehicle, a thermally conductive material is added as well as the cooling fluid to improve cooling performance, thereby preventing damage to inner components due to heat, safety accidents such as fire are prevented, and a diameter of the cable is minimized.

21 Claims, 7 Drawing Sheets

(51) Int. Cl.
*B60L 53/302* (2019.01)
*H01B 7/42* (2006.01)

(58) Field of Classification Search
USPC .......................................................... 320/109
See application file for complete search history.

(56) References Cited

U.S. PATENT DOCUMENTS

| | | | |
|---|---|---|---|
| 2015/0217654 A1* | 8/2015 | Woo ........................ | B60L 53/18 320/109 |
| 2018/0277283 A1* | 9/2018 | Remisch ................. | B60L 53/16 |
| 2019/0217728 A1 | 7/2019 | Reber et al. | |

FOREIGN PATENT DOCUMENTS

| | | | | | |
|---|---|---|---|---|---|
| CN | 108878014 | A | | 11/2018 | |
| CN | 109036694 | A | | 12/2018 | |
| CN | 209029155 | U | | 6/2019 | |
| CN | 110136877 | A | | 8/2019 | |
| CN | 114175182 | A | * | 3/2022 | ............. B60L 53/11 |
| CN | 115552552 | A | * | 12/2022 | ............. B60L 53/16 |
| EP | 3624141 | A1 | * | 3/2020 | ............. B60L 53/18 |
| ES | 2966648 | T3 | * | 4/2024 | ............. B60L 53/16 |
| JP | S59184408 | A | | 10/1984 | |
| JP | 2013099024 | A | | 5/2013 | |
| JP | 5674961 | A1 | | 1/2015 | |
| JP | 6145556 | B1 | | 5/2017 | |
| JP | 2018018748 | A | | 2/2018 | |
| JP | 2018018805 | A | | 2/2018 | |
| KR | 20150140512 | A | | 12/2015 | |
| KR | 1020160119147 | | | 10/2016 | |
| KR | 20180096259 | A | * | 8/2018 | |
| KR | 20200074931 | A | * | 6/2020 | |
| KR | 20210029117 | A | * | 3/2021 | |
| WO | 2012079631 | A1 | | 6/2012 | |
| WO | 2018139335 | A1 | | 8/2018 | |
| WO | WO-2021045560 | A1 | * | 3/2021 | ............. B60L 53/16 |
| WO | WO-2021107502 | A1 | * | 6/2021 | ............. B60L 53/16 |

OTHER PUBLICATIONS

International Search Report for related International Application No. PCT/KR2020/011936; report dated Mar. 11, 2021; (5 pages).
Written Opinion for related International Application No. PCT/KR2020/011936; report dated Mar. 11, 2021; (5 pages).
Office Action for related Chinese Application No. 202080062308.2; action dated Sep. 27, 2023; (10 pages).
Extended European Search Report for related European Application No. 20861464.4; action dated Aug. 2, 2023; (9 pages).
Office Action for related Japanese Application No. 2022-515094; action dated Apr. 14, 2023; (6 pages).

* cited by examiner

ELECTRIC VEHICLE CHARGING CABLE

CROSS-REFERENCE TO RELATED APPLICATIONS

The present application is a National Stage of International Application No. PCT/KR2020/011936 filed on Sep. 4, 2020, which claims the benefit of Korean Patent Application No. 10-2019-0109891, filed on Sep. 5, 2019, and Korean Patent Application No. 10-2020-0112883 filed on Sep. 4, 2020, filed with the Korean Intellectual Property Office, the entire contents of each hereby incorporated by reference.

FIELD

The present disclosure relates to an electric vehicle charging cable having a cooling function. More specifically, the present disclosure relates to an electric vehicle charging cable, in which a cooling fluid is used to efficiently cool heat generated during charging of an electric vehicle, a thermally conductive material is added as well as the cooling fluid to improve cooling performance, thereby preventing damage to inner components due to heat, safety accidents such as fire are prevented, and a diameter of the cable is minimized.

BACKGROUND

With the spread of electric vehicles, electric vehicle chargers have been widely installed. In addition, quick chargers have come into wide use for quick charging within a short time. Unlike slow charging, an output voltage of a quick charger is in a range of DC 50V to 450V, an output current reaches 110 A, and it will take only 50 minutes to charge an electric vehicle by the quick charger. It is expected that an output current of a quick charger will increase according to a battery capacity and charging technology of electric vehicles.

Electric current is supplied to an electric vehicle from an electric vehicle charger by connecting an electric vehicle charging cable to a main body of a quick charger, mounting a cable connector in an end of the electric vehicle charging cable, and mounting a connector of the electric vehicle charging cable in a connector of the electric vehicle.

An output current of the quick charger is 100 A or more and thus heat generated in the electric vehicle charging cable for transmitting the output current to an electric vehicle may be a problem. To minimize heat generated in the electric vehicle charging cable, a diameter of a conductor of the electric vehicle charging cable may be increased but generated heat is difficult to be sufficiently reduced and the weight of the electric vehicle charging cable increases.

Heat generated in the electric vehicle charging cable may increase a risk of fire. Furthermore, the electric vehicle charging cable is likely to come into contact with a user's body when a cable connector is mounted in a connector of an electric vehicle to charge the electric vehicle or is separated from the connector of the electric vehicle and placed in the charger. When heat generated in the electric vehicle charging cable is extremely high, the user may be injured or feel discomfort or anxiety.

SUMMARY

The present disclosure is directed to providing an electric vehicle charging cable, in which a cooling fluid is used to efficiently cool heat generated during charging of an electric vehicle, a thermally conductive material is added as well as the cooling fluid to improve cooling performance, thereby preventing damage to inner components due to heat, safety accidents such as fire are prevented, and a diameter of the cable is minimized.

The present disclosure provides an electric vehicle charging cable for connecting a main body of an electric vehicle and a cable connector to charge the electric vehicle, the electric vehicle charging cable comprising: a cooling part including a fluid tube in which a cooling fluid flows; a plurality of power units including a plurality of conductors provided around the cooling part, an insulating layer covering outer sides of the plurality of conductors, and a thermally conductive material filling a space between the cooling part and the insulating layer; and a cable jacket covering outer sides of the power units.

And the thermally conductive material may have viscosity of 103 cp to 106 cp at room temperature.

And the thermally conductive material may have thermal conductivity of 0.5 W/m·K or more.

And the thermally conductive material may comprise a mixture of a siloxane polymer and a thermal conductive metal oxide.

And a pair of power units may be provided and the cooling fluid may flow in opposite directions in cooling parts in the pair of power units.

And the electric vehicle charging cable may further comprise at least one ground unit including a ground conductor in the cable jacket and an insulating layer covering the ground conductor.

And a pair of power units may be provided and a cooling fluid supplied from the electric vehicle charger toward the cable connector may flow in a pair of cooling parts.

And the electric vehicle charging cable may further comprise a cooling fluid return part configured to return the cooling fluid, which is supplied from the pair of cooling parts, in the vicinity of the cable connector in a direction of the electric vehicle charger.

And the cooling fluid return part may be circumscribed about the pair of power units and located opposite to the ground unit.

And the fluid tube of the cooling part or a fluid tube of the cooling fluid return part may be formed of high-heat-resistant plastic, nylon, perfluoro alkoxy alkane (PFA), poly tetra fluoro ethylene (PTFE) or a urethane material.

And the conductors of the power unit may comprise stranded conductors formed by twisting strands of conductors together.

And the conductors of the power unit may be cross-wound about the cooling part in a winding pitch that is 9 to 11 times an outer diameter of a conductor layer including conductors arranged around the cooling part.

And the power units and the ground unit may be assembled together in a twisting pitch that is 17 to 23 times an outer diameter of each of the power units.

And the electric vehicle charging cable may further comprise at least one communication unit including a communication conductor and an insulating layer covering the communication conductor.

And the at least one communication unit may have a diameter less than a diameter of the power unit or a diameter of a ground unit and may be located outside a triangle connecting a center of the at least one communication unit and a center of the ground unit.

And a temperature and a flow rate of the cooling fluid supplied from the electric vehicle charger may be determined to cause a surface temperature of the cable jacket to be 50° C. or less.

And the cable jacket may be of a solid type.

And the thermally conductive material may have thermal conductivity of 0.5 W/m·K or 5.0 W/m·K.

And the present disclosure provides an electric vehicle charging cable for connecting a main body of an electric vehicle and a cable connector to charge the electric vehicle, the electric vehicle charging cable comprising: a pair of power units each comprising a plurality of stranded conductors arranged in an insulating layer in a circumferential direction; a pair of fluid tubes provided inside the plurality of stranded conductors of the pair of power units to cool heat generated in the plurality of stranded conductors, wherein a cooling fluid cooled in the main body of the electric vehicle charger flows in the pair of fluid tubes in a predetermined direction between the electric vehicle charger and the cable connector; a thermally conductive material filling between the stranded conductors of the pair of power units to increase efficiency of transfer of heat, which is generated during supply of electric current to the stranded conductors, toward the pair of fluid tubes; and a solid type cable jacket covering outer sides of the pair of power units.

And the cooling fluid flowing through a first fluid tube among the pair of fluid tubes of the pair of power units may be supplied toward the cable connector from the electric vehicle charger, and the cooling fluid flowing through a second fluid tube among the pair of fluid tubes may be returned from the cable connector toward the electric vehicle charger.

And the cooling fluid flowing through the pair of fluid tubes of the pair of power units may be supplied toward the cable connector from the electric vehicle charger, and the electric vehicle charging cable may further comprise a cooling fluid return part in which the cooling fluid returned near the cable connector may flow toward the electric vehicle charger, the cooling fluid return part being circumscribed about the insulating layer of each of the pair of power units.

According to an electric vehicle charging cable of the present disclosure, heat generated in the electric vehicle charging cable during quick charging of an electric vehicle can be efficiently cooled using a cooling fluid.

More specifically, according to the electric vehicle charging cable of the present disclosure, stable cooling performance can be ensured by providing cooling parts at the center of a pair of power units.

In the electric vehicle charging cable of the present disclosure, a space between conductors of power units is filled with a thermally conductive material, so that heat generated in the conductors during supplying of electric current to the conductors may be transferred quickly to the cooling parts through which a cooling fluid flows, thereby greatly improving cooling performance.

In addition, in the electric vehicle charging cable of the present disclosure, a cooling channel is provided in the power unit and thus a total diameter of the electric vehicle charging cable may be more compact than when technology of providing a cooling tube separately from a power unit is used.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figure 1:
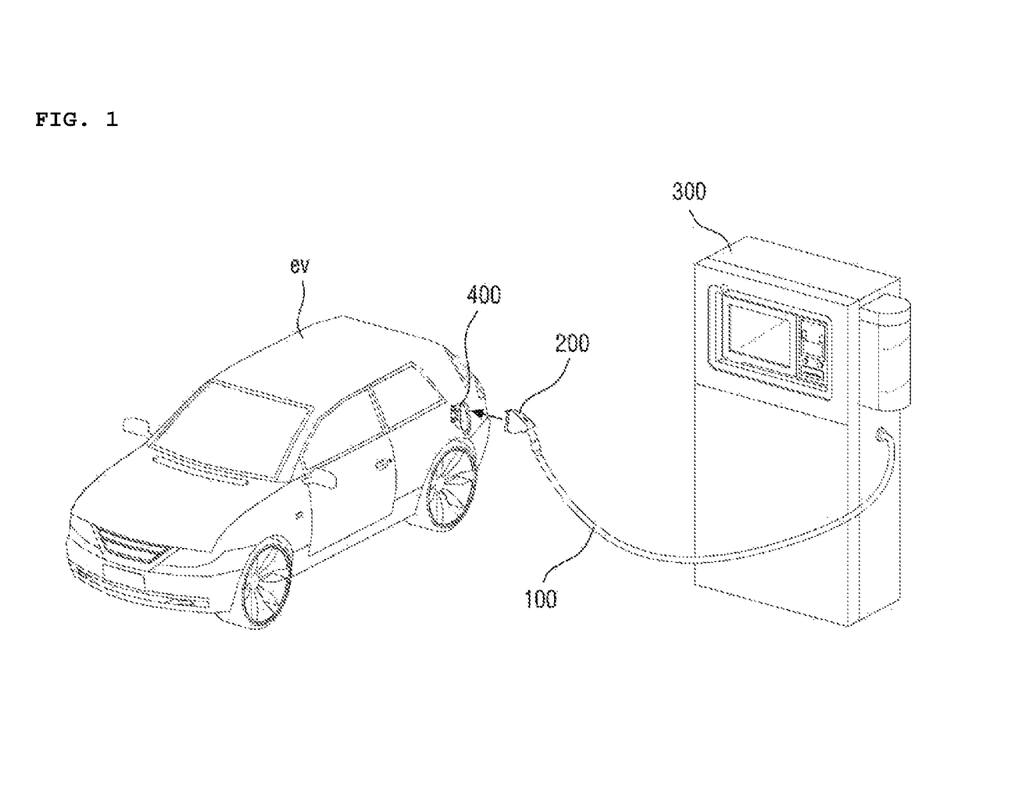
FIG. 1 illustrates an electric vehicle and an electric vehicle charger.

FIG. 1 illustrates an electric vehicle ev and an electric vehicle charger 300.

The electric vehicle charger 300 is connected to a cable connector 200 through an electric vehicle charging cable 100 to supply power to the electric vehicle ev, and the cable connector 200 is provided on an end of the electric vehicle charging cable 100.

The cable connector 200 may be mounted in an electric vehicle connector 400 of the electric vehicle ev to supply power, and charging the electric vehicle ev may be completed using a quick charger within a short time.

Heat may be generated in the electric vehicle charging cable 100, which electrically connects the electric vehicle charger 300 and the electric vehicle ev, due to a large current capacity. To prevent a risk of fire or relieve a user's anxiety, a method of cooling the electric vehicle charging cable 100 using a cooling fluid is employed in the electric vehicle charging cable 100.

Figure 2:
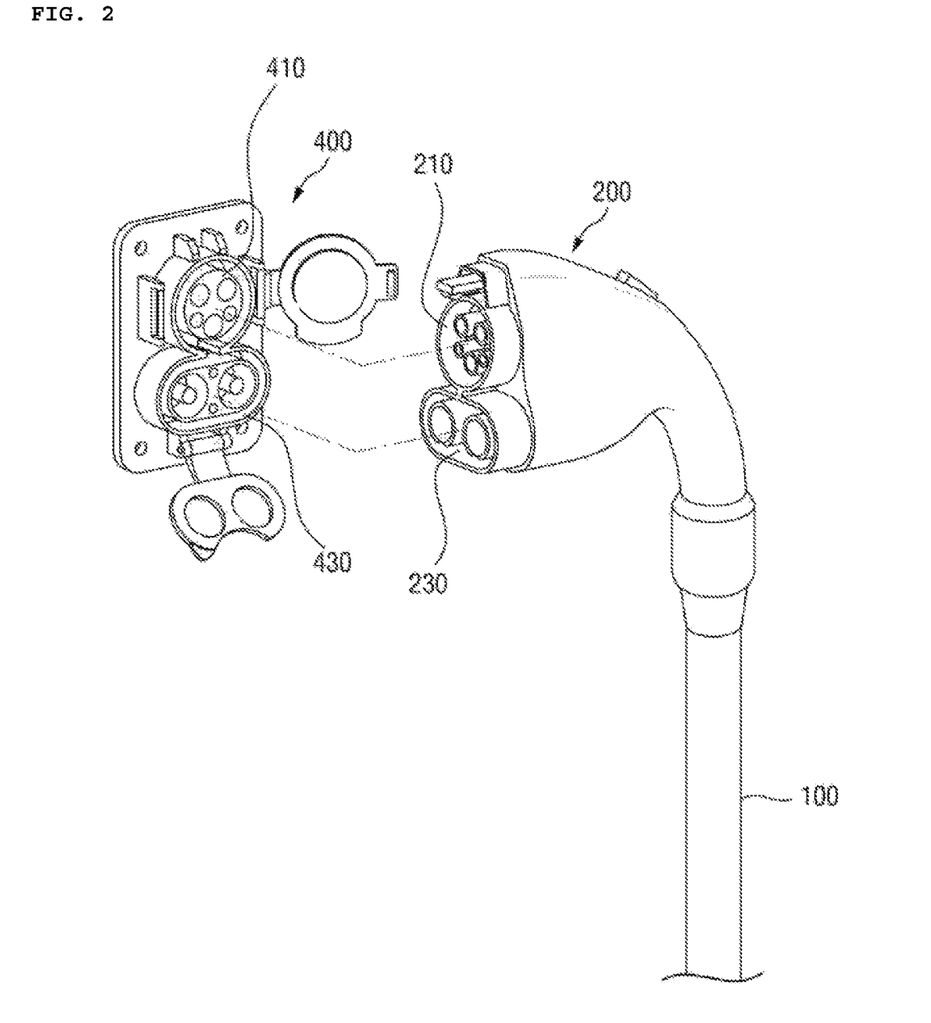
FIG. 2 illustrates an electric vehicle connector of an electric vehicle and a cable connector to which an electric vehicle charging cable is connected.

FIG. 2 illustrates an electric vehicle connector 400 of an electric vehicle and a cable connector 200 to which an electric vehicle charging cable 100 is connected. The cable connector 200 of FIG. 2 is a 'combo' connector according to one of the unification standards, which is used in the USA and Europe and is chargeable by both alternating-current (AC) slow charging and direct-current (DC) quick charging, and the electric vehicle charging cable 100 of the present disclosure is applicable thereto.

The electric vehicle charging cable 100 of the present disclosure is applicable to cable connectors according to the 'CHAdeMO' standard in Japan, a Renault '3-phase AC' standard, etc., as well as 'combo' connectors used in the US and Europe.

As illustrated in FIG. 2, the cable connector 200 is mounted in an end of the electric vehicle charging cable 100 of the present disclosure and configured to be detachably mounted in the electric vehicle connector 400 of the electric vehicle ev.

In the 'combo' connector, AC or DC connectors are unified, and AC charging part 210 and 410 and DC charging parts 230 and 430 are included in the AC or DC connectors.

Heat generated in the electric vehicle charging cable 100 connected to such a cable connector due to high electric current during quick charging may be a problem, and thus, a cooling fluid is used in the electric vehicle charging cable 100 of the present disclosure to solve the heating problem.

A structure for cooling the electric vehicle charging cable 100 using a cooling fluid has already been introduced but a cooling fluid channel should be additionally provided in the electric vehicle charging cable 100, thereby reducing cooling efficiency and increasing a diameter of the electric vehicle charging cable 100.

In the electric vehicle charging cable 100 of the present disclosure, a cooling part with a fluid tube is provided in each power unit to absorb heat through an entire outer circumferential surface of the cooling part, thus improving cooling efficiency and securing stable cooling performance minimizing a diameter of the electric vehicle charging cable 100, as will be described in detail below.

Figure 3:
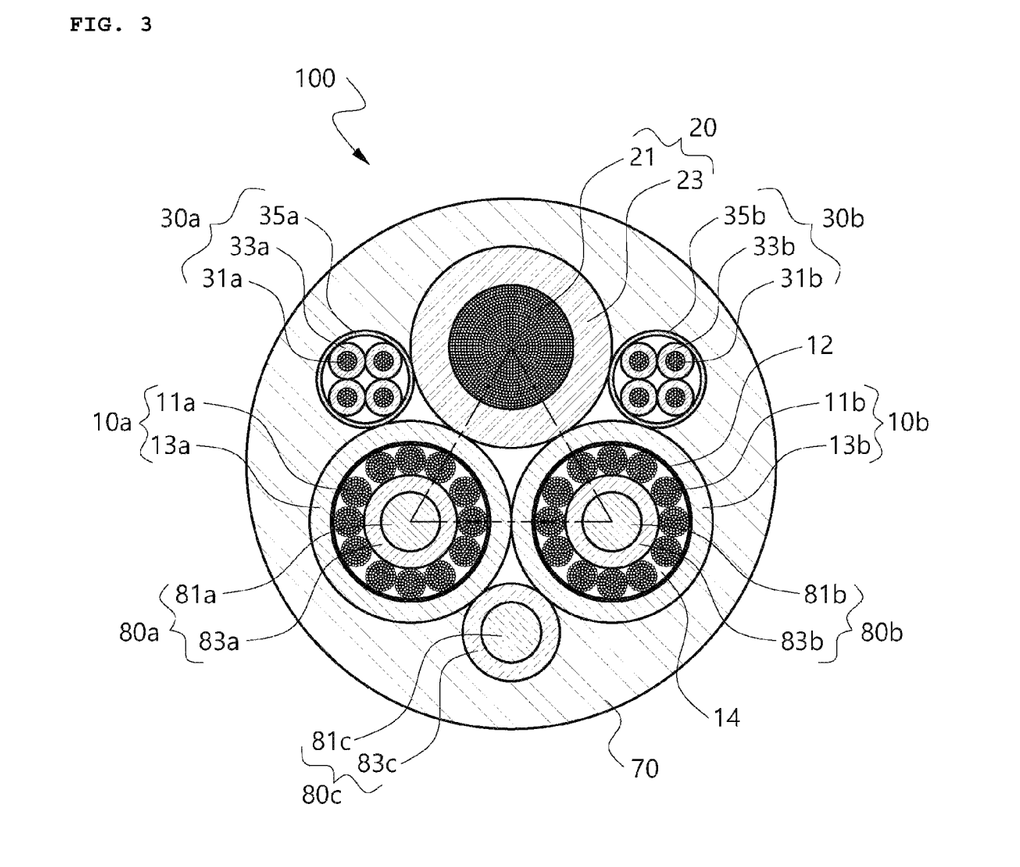
FIG. 3 is a cross-sectional view of an electric vehicle charging cable according to an embodiment of the present disclosure.
Figure 4:
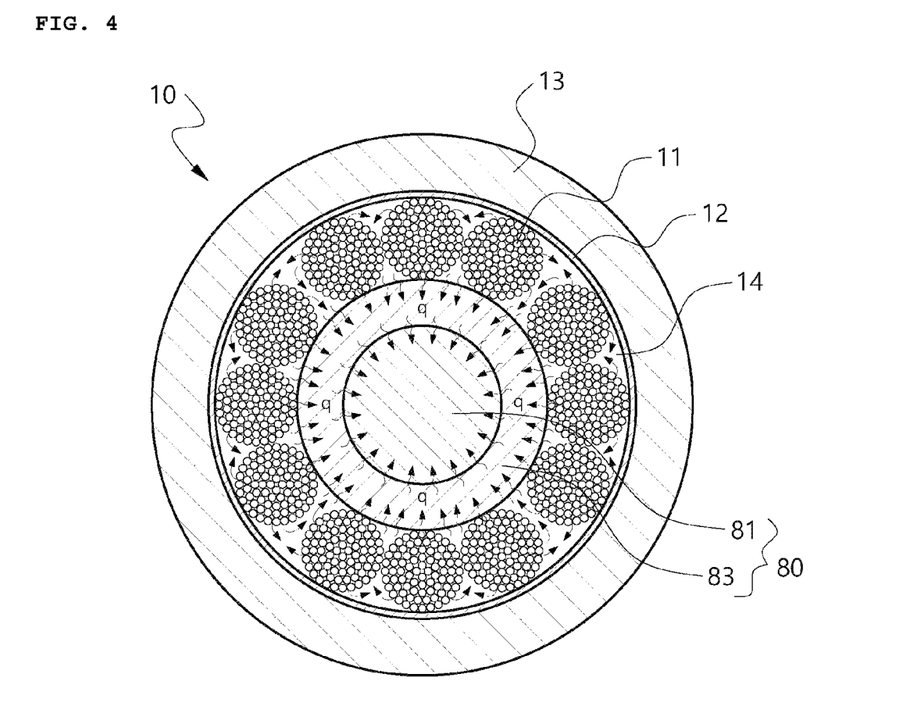
FIG. 4 is an enlarged cross-sectional view of a power unit with a cooling part of the embodiment of FIG. 3.

FIG. 3 is a cross-sectional view of an electric vehicle charging cable according to an embodiment of the present disclosure. FIG. 4 is an enlarged cross-sectional view of a power unit with a cooling part of the embodiment of FIG. 3.

The electric vehicle charging cable 100 of the present disclosure may connect a main body of an electric vehicle charger and a cable connector to charge the electric vehicle, and may include: power units 10 each including a cooling part 80 with a fluid tube 83 in which a cooling fluid flows, conductors 1 provided around the cooling part 80; an insulating layer 13 covering outer sides of the conductors 1, and a thermally conductive material 14 between the cooling part 80 and the insulating layer 13; at least one ground unit 20 including a ground connector 21 and an insulating layer 23 covering the ground connector 21; and a cable jacket 70 covering outer sides of the power units 10 and the at least one ground unit 20.

In general, in the electric vehicle charging cable 100, a heating problem occurs in power units 10*a* and 10*b* configured to supply power, and cooling parts 80*a* and 80*b* are respectively included in the power units 10*a* and 10*b*.

The cooling parts 80*a* and 80*b* may include fluid tubes 83*a* and 83*b* containing a cooling fluid flowing through cooling channels 81*a* and 81*b* inside the cooling parts 80*a* and 80*b*.

The fluid tubes 83*a* and 83*b* may have an inner diameter of 3.5 mm to 9.5 mm and an outer diameter of 5.5 mm to 12 mm, and may be formed of high-heat-resistant plastic, nylon, perfluoro alkoxy alkane (PFA), poly tetra fluor ethylene (PTFE), or a urethane material.

In relation to sizes of the fluid tubes 83*a* and 83*b*, when an outer diameter of the fluid tubes 83*a* and 83*b* was in a range of 5.5 mm to 12 mm and an inner diameter thereof was less than 3.5 mm, thicknesses of the fluid tubes 83*a* and 83*b* were extremely large and thus heat generated in conductors was not smoothly transferred to the cooling fluids, thereby lowering cooling performance, whereas when the thicknesses of the fluid tubes 83*a* and 83*b* were extremely small, the fluid tubes 83*a* and 83*b* were cracked or the cooling fluid was highly likely to leak when the electric vehicle charging cable 100 was repeatedly bent. Therefore, an inner diameter and an outer diameter of a fluid tube are preferably determined to be within the above ranges according to a material, cooling load, etc.

The cooling fluid flowing through the cooling channels 81*a* and 81*b* inside the cooling parts 80*a* and 80*b* may be provided in a liquid form capable of being cooled and flowing. The cooling fluid may be pure water or a coolant added thereto at least one of an inorganic additive such as ethylene glycol, phosphate, silicate, or borate, an antifreezing admixture, an anti-corrosive agent, a high-temperature stability improver, an antifoam agent, or an alkaline additive, and various other liquids may be selected and used according to an environment in which an electric vehicle charger is installed. Alternatively, the cooling fluid may be prepared with oil as a base material rather than water, and various additives may be added thereto.

Conductors 11*a* and 11*b* may be provided outside the cooling parts 80*a* and 80*b*. Each of the conductors 11*a* and 11*b* may be a whole conductor or a stranded conductor formed by twisting strands of conductor together. The conductors 11*a* and 11*b* may be formed of copper having high conductivity or a copper alloy.

An example in which a conductor is a stranded conductor is illustrated in the embodiment of FIG. 3 but embodiments of the present disclosure is not limited thereto. When a conductor is a stranded conductor, several tens of strands of conductor may be assembled together as shown in FIG. 3.

Conductors may be cross-wound about the cooling parts 80*a* and 80*b* in a winding pitch that is 9 to 11 times an outer diameter of a conductor layer consisting of multiple conductors arranged around the cooling parts 80*a* and 80*b*.

When the winding pitch is less than 9 times, torsion resistance in a pitch direction is high, thus reducing flexibility, and when the winding pitch is greater than 11 times, the conductors may be vulnerable to stress due to bending, thus reducing long-term durability.

A taping layer 12 may be further provided outside the conductor layer to cover the conductor layer.

Insulating layers 13*a* and 13*b* may be provided outside the taping layer 12 and may be formed in different colors. The insulating layers 13*a* and 13*b* may be formed of a synthetic resin, e.g., a rubber or plastic material according to the IEC 62893 standard.

The electric vehicle charging cable 100 of the present disclosure may further include a thermally conductive material filling in an empty space between the conductors, so that heat generated during the supply of electric current to the conductors may be quickly transferred to the cooling parts 80*a* and 80*b*.

The thermally conductive material may be, for example, a thermal compound material, and a certain degree of fluidity thereof should be secured so that the thermally conductive material may be injected between conductors of a flexible cable.

Thermal conductivity of the thermally conductive material may be 0.5 W/m·K or more, and preferably, about 0.5 W/m·K to 5.0 W/m·K.

When the thermal conductivity of the thermally conductive material was less than 0.5 W/m·K, the performance of a cooling part may decrease, thus increasing temperature of a cable jacket, and heat may be continuously and locally transferred to a power unit, thus reducing the lifespan of an insulator or causing the aging of the thermally conductive material, and when the thermal conductivity of the thermally conductive material was greater than 5.0 W/m·K, cable manufacturing costs may greatly increase or a fluidity or viscosity condition to be described below was difficult to be satisfied.

The thermally conductive material may be, for example, a mixture of a siloxane polymer and a thermally conductive metal oxide but may be composed of various other materials when a certain degree of fluidity and thermal conductivity are secured.

The thermally conductive material of the electric vehicle charging cable 100 for which a certain degree of flexibility should be secured may have viscosity of about $10^3$ cp to $10^6$ cp at room temperature (20° C.). When the viscosity is less than $10^3$ cp, fluidity may be extremely high and the thermally conductive material may leak to the outside of the taping layer 12 covering the conductor layer and thus a state in which a space between the conductors is uniformly filled with the thermally conductive material cannot be maintained, thereby reducing a cooling effect, and when the viscosity is greater than $10^6$ cp, the flexibility of the electric vehicle charging cable 100 may reduce and the thermally conductive material may crack due to a usage environment in which a cable is repeatedly bent and moved, thereby reducing thermally conduction performance.

As shown in FIG. 4, the thermally conductive material may be injected between conductors or between strands of a conductor of a stranded conductor to quickly collect heat q generated in the conductors and transfer the heat q to a cooling fluid flowing in a cooling part, thereby greatly increasing cooling performance.

That is, when there is an empty space between conductors, heat emitted from outer circumferential surfaces of the conductors toward a fluid tube is easily transferred in a direction of the fluid tube but heat emitted in other directions is difficult to be transferred toward a cooling part or a heat transfer time may increase.

However, when the thermally conductive material 14 fills a space between the conductors, the movement and transfer of the heat q may increase due to the thermally conductive material 14, thereby improving heat exchange efficiency of a cooling fluid flowing in the cooling part.

In particular, conductors may be arranged without a gap in a circumferential direction on an outer circumferential surface of a fluid tube of the cooling part 80 but at least some of the conductors may be spaced apart from each other. When a gap between the at least some conductors is filled with the thermally conductive material, a path of transfer of heat generated in the conductors to the cooling part 80 may increase, thereby greatly increasing cooling performance.

The cooling fluid flowing through the cooling parts 80*a* and 80*b* inside the power units 10*a* and 10*b* may cool heat generated in the power units 10*a* and 10*b*, a terminal of the cable connector or the like while flowing in the fluid tubes 83*a* and 83*b* in the electric vehicle charger 300 of FIG. 1 and thereafter be returned to the electric vehicle charger 300, cooled and recirculated.

Therefore, a direction of a flow channel of the cooling fluid used for cooling the power units 10*a* and 10*b*, the cable connector, etc. may be changed in the vicinity of the cable connector, and the cooling fluid may be returned to the electric vehicle charger 300 through a cooling fluid return part 80*c* provided outside the power units 80*a* and 80*b*, after the power units 10*a* and 10*b* and the cable connector are cooled by the cooling fluid flowing through the cooling parts 80*a* and 80*b* of the power units 10*a* and 10*b*.

The cooling fluid return part 80*c* may include a returning channel 81*c* for returning a cooling fluid and a fluid tube 83*c* forming the returning channel 81*c*, similar to a cooling part.

That is, unlike an embodiment of FIG. 5 described below, in the embodiment of FIG. 3, a pair of power units 10*a* and 10*b* are provided, the cooling fluid flowing in the cooling parts 80*a* and 80*b* of the power units 10*a* and 10*b* may be supplied from the electric vehicle charger toward the cable connector, and the cooling fluid supplied toward the cable connector through the pair of cooling parts 80*a* and 80*b* may be returned toward the electric vehicle charger in the vicinity of the cable connector through the cooling fluid return part 80*c*.

Therefore, a direction of flow of the cooling fluid supplied through the pair of cooling parts 80*a* and 80*b* may be the same as an orientation of the cable connector of the electric vehicle charger, and a direction of flow of the cooling fluid in the cooling fluid return part 80*c* may be opposite to the orientation of the cable connector.

As described above, the generation of heat in a high-capacity and high-speed charger may be stably reduced by respectively providing the cooling parts 80*a* and 80*b* in the power units 10*a* and 10*b* and returning the cooling fluid by the cooling fluid return part 80*c*.

The cooling fluid return part 80*c* may be located to be circumscribed about the pair of power units 10*a* and 10*b* to provide a cooling function of the power units 10*a* and 10*b* during the returning of the cooling fluid, as well as a function of returning the cooling fluid.

The cooling fluid return part 80*c* configured to return the cooling fluid may be disposed to face the ground unit 20 with respect to the pair of power units 10*a* and 10*b*, thereby minimizing an empty inner space of the electric vehicle charging cable 100, improving roundness, and reducing a total outer diameter of the electric vehicle charging cable 100.

The cooling fluid return part 80*c* may be formed of high-heat-resistant plastic, nylon, poly tetra fluoro ethylene (PTFE), or a urethane material.

The electric vehicle charging cable 100 of the present disclosure may further include at least one ground unit 20.

The ground conductor 21 of the ground unit 20 may also be a stranded conductor, and the ground insulating layer 23 may be formed of synthetic resin, e.g., a rubber or plastic material according to the IEC 62893 standard, similar to the insulating layer of the power unit 10.

The electric vehicle charging cable 100 of the present disclosure may further include at least one communication unit 30.

The communication unit 30 may include a conductor 31 and an insulating layer 33 covering the conductor 31, and may further include a communication unit jacket 35 to cover and finish a plurality of communication units 30.

The communication unit 30 may have a diameter less than that of the power unit 10 or the ground unit 20 and be located outside a triangle connecting the centers of the power unit 10 and the ground unit 20, thereby minimizing an increase of a diameter of a cable and contributing to the formation of the cable in a round shape.

The insulating layer 33 may be formed of rubber, a plastic material or the like according to the IEC 62893 standard, and the communication unit jacket 35 may also be formed of rubber, a plastic material or the like according to the IEC 62893 standard.

To manufacture a cable in a round shape, a triangle connecting the center of the pair of power units 10*a* and 10*b* and the ground unit 20, which have substantially the same outer diameter, may be configured to be substantially the same as a regular triangle as shown in FIG. 3.

The ground unit 20 and the cooling fluid return part 80c may be disposed to face each other with the pair of power units 10a and 10b interposed therebetween to be circumscribed about the pair of power units 10a and 10b, respectively.

In addition, the power units 10a and 10b and the ground unit 20 may be assembled together in a twisting pitch that is 17 to 23 times the outer diameter of the power units 10a and 10b.

The cable jacket 70 may be provided to cover the power units 10a and 10b, the ground unit 20, the communication units 30a and 30b, and the cooling fluid return part 80c of the electric vehicle charging cable 100 according to the present disclosure.

The cable jacket 70 may be of a solid type to prevent external impacts. Because the cable jacket 70 is of the solid type, a cable may be manufactured in a round shape without a filler and an empty space in the cable may be canceled to improve impact resistance.

The cable jacket 70 may be formed of rubber, a plastic material or the like according to the IEC 62893 standard.

A cable jacket of an electric vehicle charging cable is shown and described as a solid type jacket in FIG. 3 and FIGS. 6 and 7 to be described below but is not limited thereto and may be a simple armor cable jacket.

Figure 5:
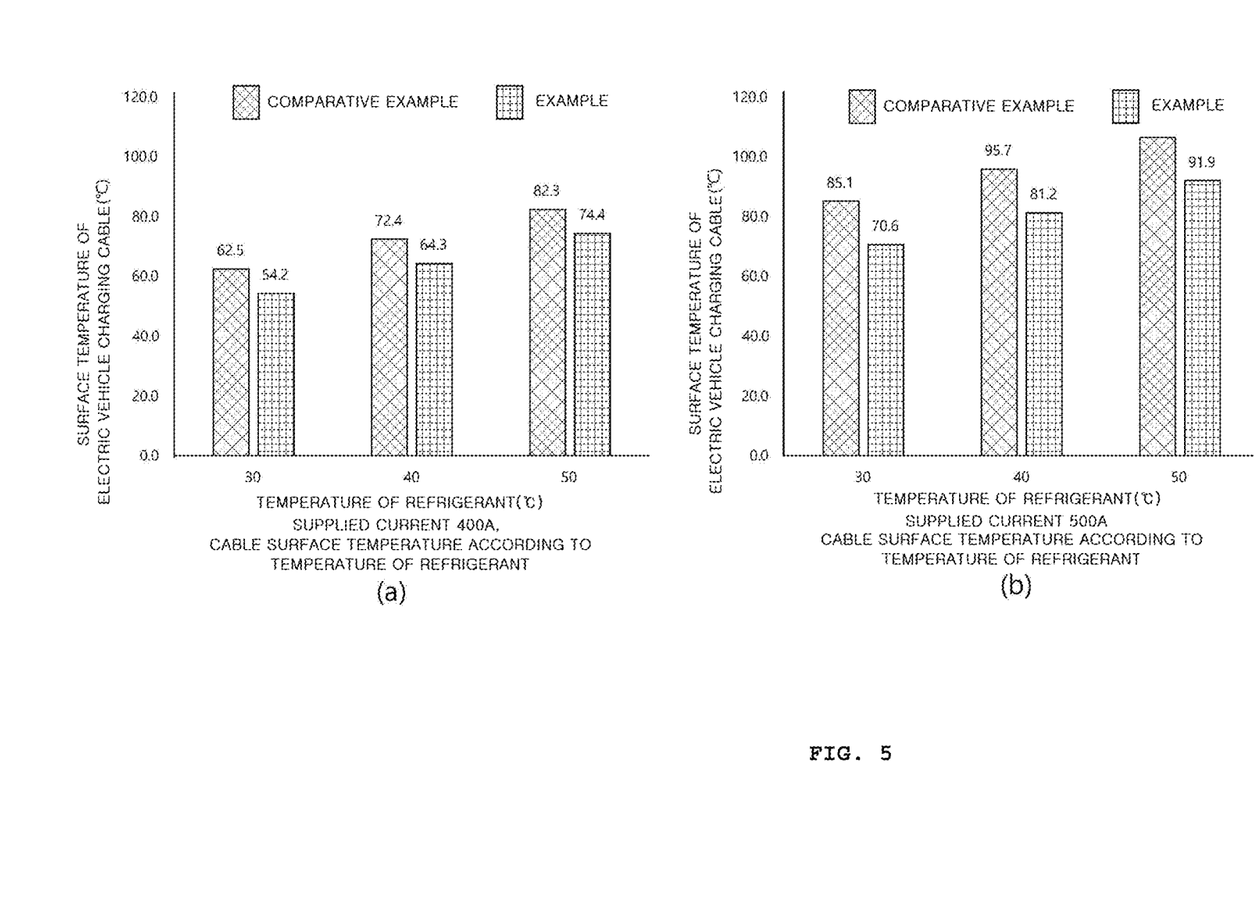
FIG. 5 is a graph showing a result of conducting a current carrying test with respect to a comparative example in which a thermally conductive material is not injected into an empty space between conductors of power units of an electric vehicle charging cable and an example of the present disclosure in which the thermally conductive material is injected between conductors of power units of an electric vehicle charging cable.

FIG. 5 is a graph showing a result of conducting a current carrying test with respect to a comparative example in which a thermally conductive material is not injected into an empty space between conductors of power units of the electric vehicle charging cable 100 and an example of the present disclosure in which the thermally conductive material is injected between the conductors of the power units of the electric vehicle charging cable 100.

Specifically, FIG. 5A shows a result of a test when 400 A was supplied through an electric vehicle charger, and FIG. 5B shows a result of the test when 500 A was supplied through the electric vehicle charger.

A cable in which a cooling channel inside a fluid tube of a cooling part has a diameter of 4 mm, the fluid tube has an outer diameter of 6 mm, twelve conductors arranged around the cooling part have a diameter of 1.78 mm, and a power unit has an outer diameter of 13 mm was used in the comparative example and the example.

An ethylene glycol mixture was applied as a cooling fluid flowing in the cooling part, the fluid tube of the cooling part was formed of a perfluoroalkoxy alkane (PFA) material, which is a fluoro resin, the conductors were formed of copper, and an insulating layer of the power unit was formed of an ethylene propylene (EPR) material.

The cooling fluid has thermal conductivity of about 0.252 [W/mK], the thermally conductive material has thermal conductivity of about 1.0 [W/mK], the fluid tube has thermal conductivity of about 0.250 [W/mK], and the insulating layer has thermal conductivity of about 0.286 [W/mK].

In the example, the thermally conductive material injected between the conductors of the power units was a mixture of a siloxane polymer and a thermally conductive metal oxide.

The cooling fluid used in the text was circulated to have a flow rate sufficient to minimize a temperature deviation in each of almost all sections, the test was conducted for three cases, i.e., when temperature of the cooling fluid was 30° C., 40° C., and 50° C., and the cooling fluid was supplied at a flow rate sufficient to maintain the temperature of the cooling fluid almost constant in all of test sections of the cable.

The result of the test of FIG. 5 reveals that cable surface temperatures were proportional to a temperature of the cooling fluid in both a case in which 400 A was supplied and a case in which current of 500 A was supplied. A result of comparing surface temperatures of the electric vehicle charging cable 100 shows that the difference between surface temperatures according to a temperature of the cooling fluid were about 8° C. in the test of supplying 400 A, and the difference between surface temperatures according to a temperature of the cooling fluid were about 10° C. in the test of supplying 500 A.

It may be assumed that the thermal conductivity of the above-described thermally conductive material is about 1.0 [W/mK] and the thermal conductivity of heated air is about 0.03 [W/mK] and thus the efficiency of transfer of heat to a cooling part between conductors of power units may increase about 30 times. Therefore, when a space between the conductors of the power units was filled with the thermally conductive material, heat generated in the conductors was additionally reduced by about ° C. or 10° C., which, however, may vary according to the intensity of current supplied, when the heat was cooled using the cooling fluid.

Figure 6:
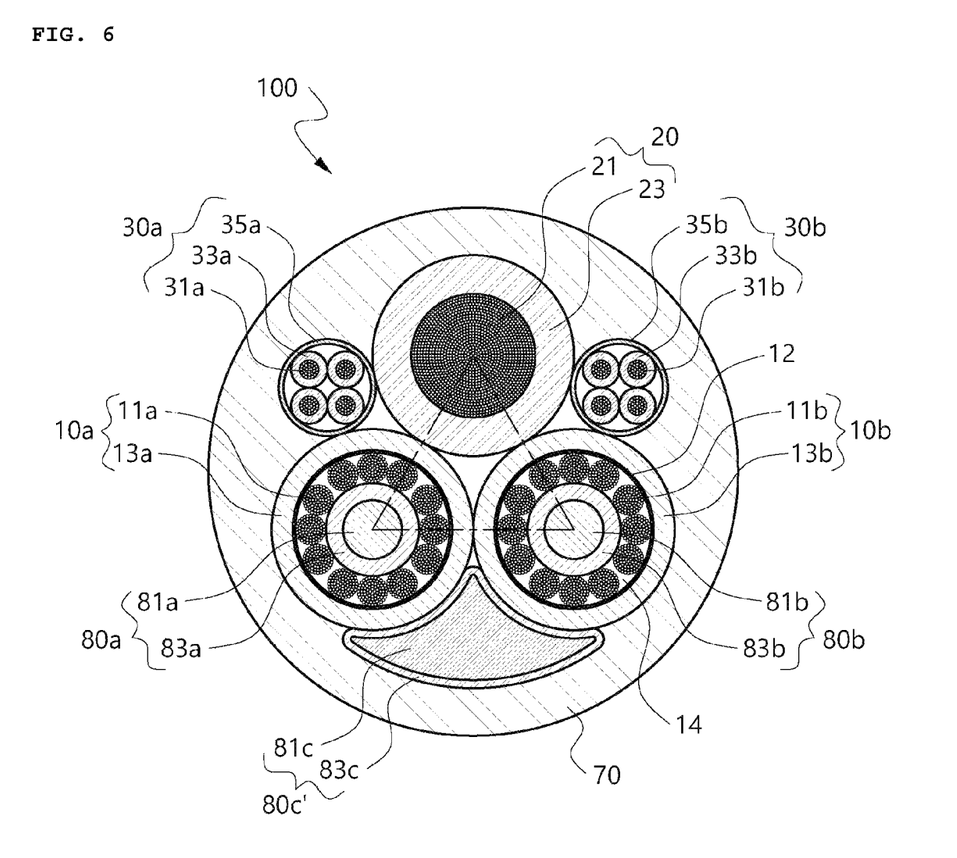
FIG. 6 is a cross-sectional view of an electric vehicle charging cable according to another embodiment of the present disclosure.

FIG. 6 is a cross-sectional view of an electric vehicle charging cable 100 according to another embodiment of the present disclosure. A description of parts that are the same as those of FIG. 3 will be omitted here.

In the embodiment of FIG. 3, the cooling fluid return part 80c is in the form of a circular pipe to return a cooling fluid supplied to cool power units, whereas in the embodiment of FIG. 6, a cooling fluid return part 80c' may be in the form of shaped filler or fan rather than the form of circular pipe.

When the cooling fluid return part 80c' is in the form of shaped filler or fan, it is possible to secure a returning channel area sufficient to return the cooling fluid and contribute to achieving the roundness of a cable.

That is, in the embodiment of FIG. 3, when the fluid tube 83 and the cooling fluid return part 80c' of a cooling part in a power unit have the same size, a channel area for returning the cooling fluid supplied through two fluid tubes may be insufficient.

In contrast, as shown in FIG. 6, when the cooling fluid return part 80c' is in the form of shaped filler or fan to make full use of an inner empty space of the cable, the roundness of the cable may be maintained while securing a sufficient cooling fluid returning area.

Figure 7:
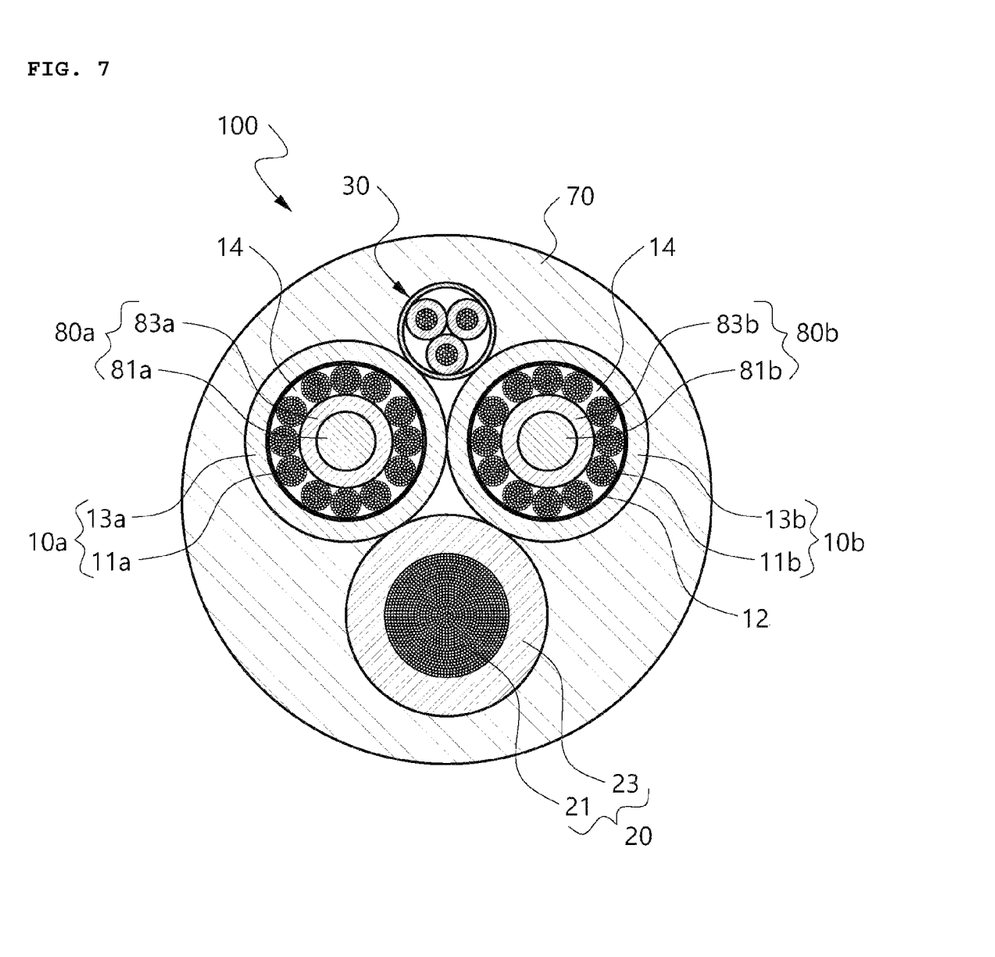
FIG. 7 is a cross-sectional view of an electric vehicle charging cable according to another embodiment of the present disclosure.

FIG. 7 is a cross-sectional view of an electric vehicle charging cable 100 according to another embodiment of the present disclosure. A description of parts that are the same as those of FIG. 3 or 6 will be omitted here.

The electric vehicle charging cable 100 of FIG. 7 is the same as the electric vehicle charging cable 100 of FIG. 3 or 6 in that the electric vehicle charging cable 100 includes one ground unit 30, a pair of power units 10a and 10b, and a cooling part 80 at a center of each of the pair of power units 10a and 10b, a cooling fluid flows through a fluid tube of the cooling part 80, and a space between conductors of power units is filled with a thermally conductive material to enhance cooling performance of the electric vehicle charging cable 100.

The cooling fluid supplied from the electric vehicle charger 300 is supplied through the cooling part 80a or 80b of one of the pair of power units 10a and 10b, and returned through the cooling part 80b or 80a of the other power unit 10a or 10b.

That is, one of cooling parts may be used as a means for supplying the cooling fluid, and the other cooling part may be used as a means for returning the cooling fluid.

That is, in the embodiment of FIG. 7, a returning tube for returning the cooling fluid is omitted unlike in the embodiment of FIG. 3 or 6 but a cooling part is included in a power unit, similar to the embodiment of FIG. 3 or 6. It was confirmed that sufficient cooling performance was achieved by controlling a supply temperature and a flow rate of the cooling fluid or was achieved when an electric vehicle does not need to be charged with high power or by quick charging.

In all of the embodiments of FIGS. 3, 6 and 7, cooling performance may be improved due to the cooling fluid and the thermally conductive material, and the durability of the electric vehicle charging cable 100 may be increased and safety accidents may be prevented by controlling a flow rate, an initial supply temperature, etc. of the cooling fluid such that a surface temperature of a cable jacket may be less than or equal to a target temperature, e.g., 60° C.

Referring to FIGS. 3, 6 and 7, in the electric vehicle charging cable 100 of the present disclosure, heat generated in the electric vehicle charging cable 100 during quick charging of an electric vehicle may be efficiently cooled using the cooling fluid and the thermally conductive material, a cooling part may be provided at a center of each power unit to secure stable cooling performance, each inner component of each power unit may be formed of a heat-resistant material to minimize the transfer of heat to the outside or the inside of the electric vehicle charging cable 100, thereby reducing discomfort or anxiety that a user may feel and preventing inner components from being melted during the coating of an outer jacket, and a cooling channel may be provided at the center of each power unit and thus the electric vehicle charging cable 100 may have a more compact diameter than when only a cooling part is provided outside each power unit.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An electric vehicle charging cable for connecting a main body of an electric vehicle and a cable connector to charge the electric vehicle, the electric vehicle charging cable comprising:
a cooling part including a fluid tube in which a cooling fluid flows;
a plurality of power units including a plurality of conductors provided around the cooling part, an insulating layer covering outer sides of the plurality of conductors, and a thermally conductive material filling a space between the cooling part and the insulating layer; and
a cable jacket covering outer sides of the power units.

2. The electric vehicle charging cable of claim 1, wherein the thermally conductive material has viscosity of $10^3$ cp to $10^6$ cp at room temperature.

3. The electric vehicle charging cable of claim 2, wherein the thermally conductive material has thermal conductivity of 0.5 W/m·K or more.

4. The electric vehicle charging cable of claim 2, wherein the thermally conductive material comprises a mixture of a siloxane polymer and a thermal conductive metal oxide.

5. The electric vehicle charging cable of claim 1, wherein a pair of power units are provided, wherein the cooling fluid flows in opposite directions in cooling parts in the pair of power units.

6. The electric vehicle charging cable of claim 1, further comprising at least one ground unit including a ground conductor in the cable jacket and an insulating layer covering the ground conductor.

7. The electric vehicle charging cable of claim 1, wherein a pair of power units are provided, wherein a cooling fluid supplied from the electric vehicle charger toward the cable connector flows in a pair of cooling parts.

8. The electric vehicle charging cable of claim 7, further comprising a cooling fluid return part configured to return the cooling fluid, which is supplied from the pair of cooling parts, in the vicinity of the cable connector in a direction of the electric vehicle charger.

9. The electric vehicle charging cable of claim 8, wherein the cooling fluid return part is circumscribed about the pair of power units and located opposite to the ground unit.

10. The electric vehicle charging cable of claim 1, wherein the fluid tube of the cooling part or a fluid tube of the cooling fluid return part is formed of high-heat-resistant plastic, nylon, perfluoro alkoxy alkane (PFA), poly tetra fluoro ethylene (PTFE) or a urethane material.

11. The electric vehicle charging cable of claim 1, wherein the conductors of the power unit comprise stranded conductors formed by twisting strands of conductors together.

12. The electric vehicle charging cable of claim 1, wherein the conductors of the power unit are cross-wound about the cooling part in a winding pitch that is 9 to 11 times an outer diameter of a conductor layer including conductors arranged around the cooling part.

13. The electric vehicle charging cable of claim 6, wherein the power units and the ground unit are assembled together in a twisting pitch that is 17 to 23 times an outer diameter of each of the power units.

14. The electric vehicle charging cable of claim 1, further comprising at least one communication unit including a communication conductor and an insulating layer covering the communication conductor.

15. The electric vehicle charging cable of claim 14, wherein the at least one communication unit has a diameter less than a diameter of the power unit or a diameter of a ground unit and is located outside a triangle connecting a center of the at least one communication unit and a center of the ground unit.

16. The electric vehicle charging cable of claim 1, wherein a temperature and a flow rate of the cooling fluid supplied from the electric vehicle charger are determined to cause a surface temperature of the cable jacket to be 50° C. or less.

17. The electric vehicle charging cable of claim 1, wherein the cable jacket is of a solid type.

18. The electric vehicle charging cable of claim 3, wherein the thermally conductive material has thermal conductivity of 0.5 W/m·K or 5.0 W/m·K.

19. An electric vehicle charging cable for connecting a main body of an electric vehicle and a cable connector to charge the electric vehicle, the electric vehicle charging cable comprising:
a pair of power units each comprising a plurality of stranded conductors arranged in an insulating layer in a circumferential direction;
a pair of fluid tubes provided inside the plurality of stranded conductors of the pair of power units to cool heat generated in the plurality of stranded conductors, wherein a cooling fluid cooled in the main body of the electric vehicle charger flows in the pair of fluid tubes in a predetermined direction between the electric vehicle charger and the cable connector;

a thermally conductive material filling between the stranded conductors of the pair of power units to increase efficiency of transfer of heat, which is generated during supply of electric current to the stranded conductors, toward the pair of fluid tubes; and a solid type cable jacket covering outer sides of the pair of power units.

20. The electric vehicle charging cable of claim 19, wherein the cooling fluid flowing through a first fluid tube among the pair of fluid tubes of the pair of power units is supplied toward the cable connector from the electric vehicle charger, and the cooling fluid flowing through a second fluid tube among the pair of fluid tubes is returned from the cable connector toward the electric vehicle charger.

21. The electric vehicle charging cable of claim 19, wherein the cooling fluid flowing through the pair of fluid tubes of the pair of power units is supplied toward the cable connector from the electric vehicle charger, and the electric vehicle charging cable further comprises a cooling fluid return part in which the cooling fluid returned near the cable connector flows toward the electric vehicle charger, the cooling fluid return part being circumscribed about the insulating layer of each of the pair of power units.

* * * * *